(12) United States Patent
Kesil et al.

(10) Patent No.: US 6,891,380 B2
(45) Date of Patent: May 10, 2005

(54) SYSTEM AND METHOD FOR MEASURING CHARACTERISTICS OF MATERIALS WITH THE USE OF A COMPOSITE SENSOR

(75) Inventors: Boris Kesil, San Jose, CA (US); Leonid Velikov, San Carlos, CA (US); Yuri Vorobyev, San Carlos, CA (US)

(73) Assignee: MultiMetrixs, LLC, Santa Clara, CA (US)

( * ) Notice: Subject to any disclaimer, the term of this patent is extended or adjusted under 35 U.S.C. 154(b) by 0 days.

(21) Appl. No.: 10/449,892

(22) Filed: Jun. 2, 2003

(65) Prior Publication Data

US 2004/0239336 A1 Dec. 2, 2004

(51) Int. Cl.$^7$ .................. G01R 27/04; G01R 33/12; G01B 7/06
(52) U.S. Cl. .................. 324/635; 324/633; 324/230
(58) Field of Search .................. 324/635, 633, 324/600, 629, 662, 663, 668, 652, 654, 658, 230, 236, 687, 708, 457; 331/44, 45, 46, 56; 427/8, 9; 118/102, 204

(56) References Cited

U.S. PATENT DOCUMENTS

| | | | | |
|---|---|---|---|---|
| 4,182,986 A | * | 1/1980 | Parker .................. | 324/236 |
| 4,489,278 A | * | 12/1984 | Sawazaki .................. | 324/457 |
| 4,648,087 A | * | 3/1987 | Scranton et al. .......... | 360/234.7 |
| 4,958,131 A | * | 9/1990 | Thorn .................. | 324/708 |
| 5,206,588 A | * | 4/1993 | Thorn .................. | 324/230 |
| 5,223,796 A | * | 6/1993 | Waldman et al. .......... | 324/687 |
| 5,276,398 A | * | 1/1994 | Withers et al. .......... | 324/318 |
| 6,111,520 A | * | 8/2000 | Allen et al. .......... | 340/870.16 |
| 6,278,379 B1 | * | 8/2001 | Allen et al. .......... | 340/870.16 |
| 6,593,738 B2 | | 7/2003 | Kesil et al. | |
| 6,657,439 B1 | * | 12/2003 | Harada .................. | 324/600 |
| 6,815,958 B2 | | 11/2004 | Kesil et al. | |

OTHER PUBLICATIONS

U.S. Appl. No. 10/386,648, filed Mar. 13, 2003, Boris Kesil et al.
U.S. Appl. No. 10/434,625, filed May 12, 2003, Boris Kesil et al.

* cited by examiner

*Primary Examiner*—N. Le
*Assistant Examiner*—Hoai-An D. Nguyen

(57) ABSTRACT

The system of the invention for measuring characteristics of thin conductive and non-conductive material, such as bulk material or films, is based on the use of a resonance oscillating circuit that incorporates at least two components selected from the group consisting of an inductive coil and a capacitor, which in combination form a sensor that could be approached close to the surface to be measured. The measurement of the film or material characteristics, such as film resistance (film thickness) or a dielectric constant (film thickness) of a non-conductive material, is based on the principle that the sensor is approached to the measured surface at a distance, at which the inductance and capacitance of the sensor generate in the measured material a virtual coil and an additional capacitance, which strongly depend on the characteristics of the measured material. As the sensor approached towards the surface to be measured, the sensor-material system generates a series of resonances having different values of power. One of these resonances can be defined as the so-called full resonance, which is characterized by the maximum value of the power, and hence provides the most accurate measurement and can be used for precisely determining the measurement distance. By comparing the results of measurements with those known from measuring the precalibrated films or materials under the same conditions, it becomes possible to determine the target characteristics of the films or materials.

13 Claims, 14 Drawing Sheets

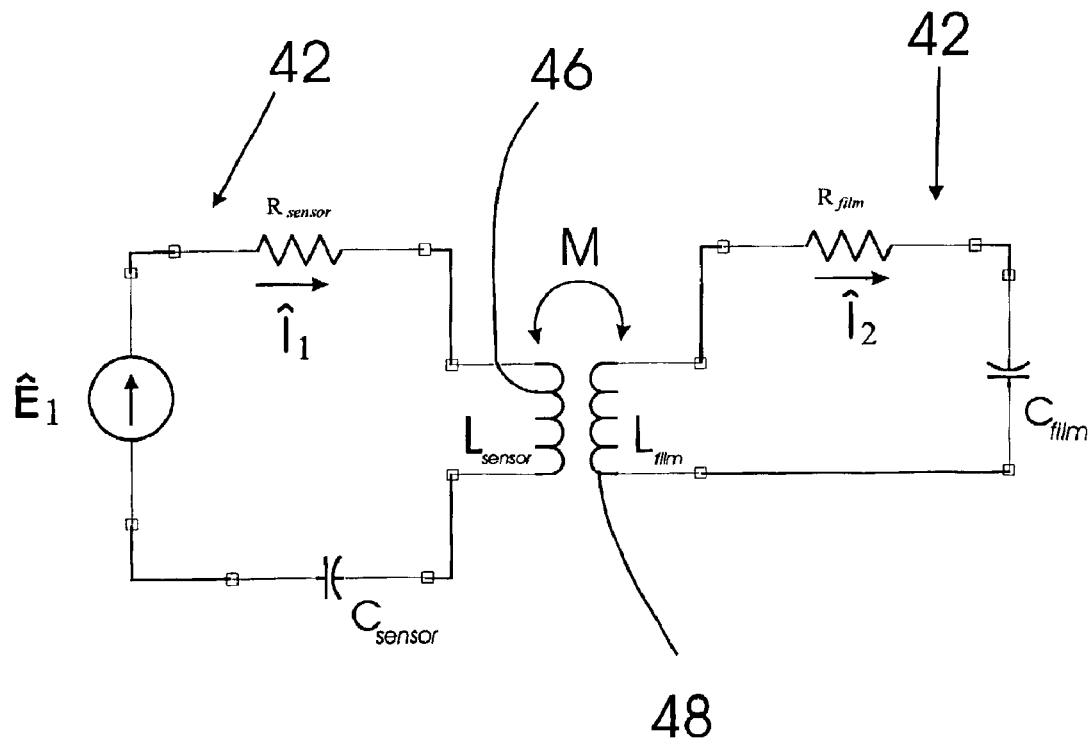
Fig.1, PRIOR ART

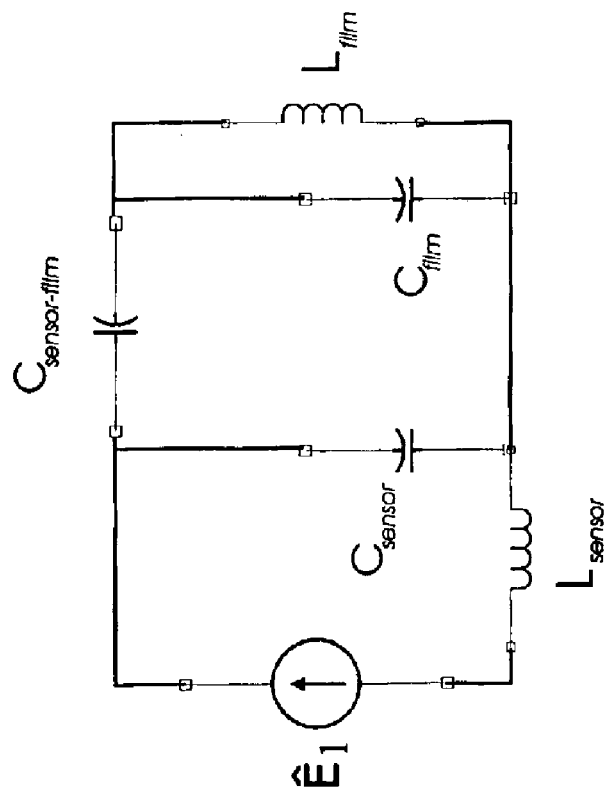
Fig.3, PRIOR ART
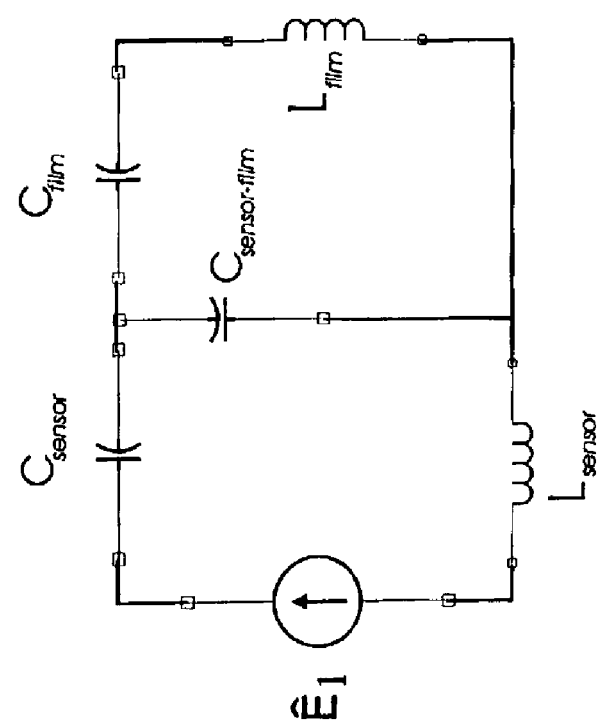
Fig.2, PRIOR ART

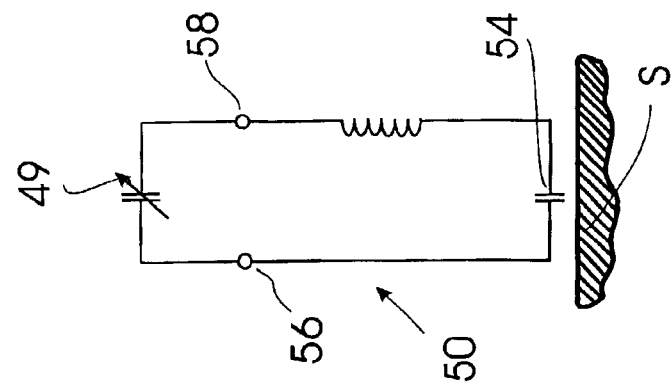
Fig.6, PRIOR ART
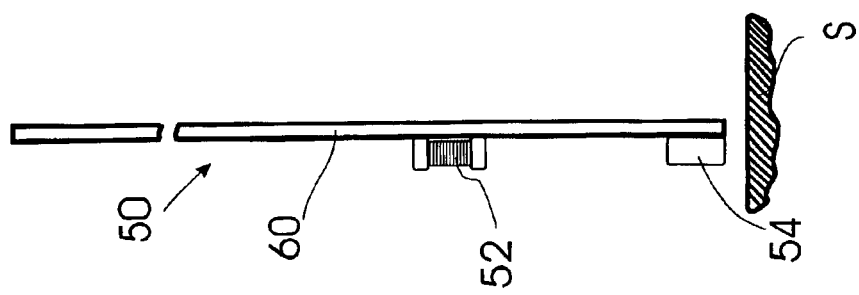
Fig.5, PRIOR ART
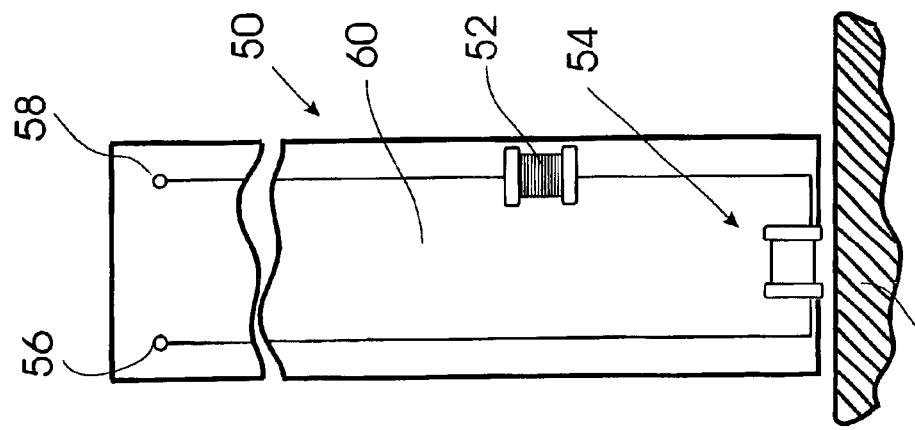
Fig.4A, PRIOR ART

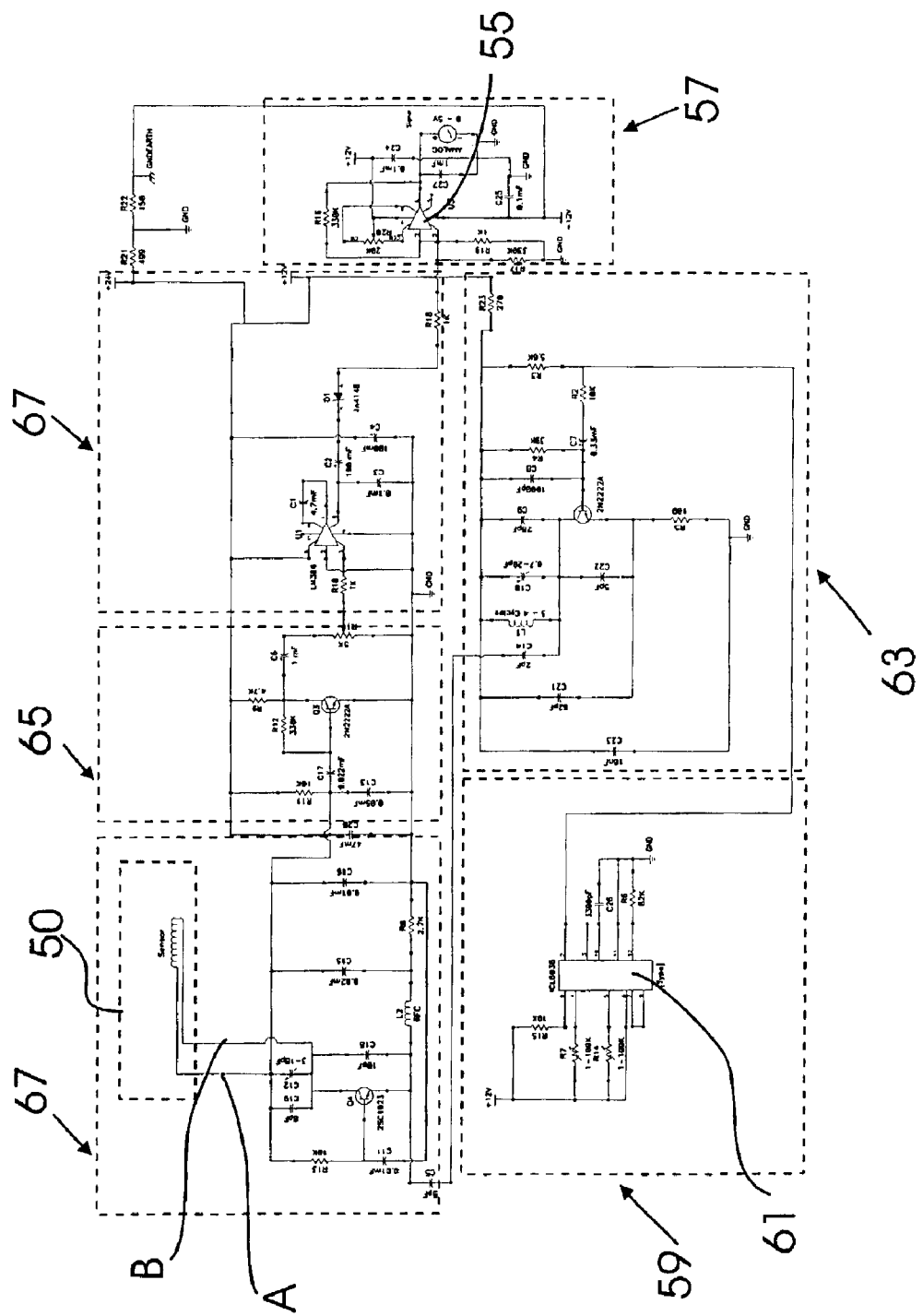
Fig. 4B, PRIOR ART

SYSTEM AND METHOD FOR MEASURING CHARACTERISTICS OF MATERIALS WITH THE USE OF A COMPOSITE SENSOR

CROSS-REFERENCES TO RELATED APPLICATIONS

The present patent application is related to the following earlier filed applications: U.S. patent application Ser. No. 954,550 filed on Sep. 17, 2001; U.S. patent application Ser. No. 359,378 filed by the same applicants as the present application on Feb. 7, 2003; U.S. patent application Ser. No. 386,648 filed by the same applicants as the present application on Mar. 13, 2003, and U.S. patent application Ser. No. 434,625 filed by the same applicants as the present application on May 12, 2003.

FIELD OF THE INVENTION

The present invention relates to the field of measurement of electrophysical characteristics of such materials as dielectrics, semiconductors, and metals, and more specifically, for measuring such characteristics as surface resistance, bulk resistance, dielectric constant, thickness of thin films, etc. In particular, the invention may find use in measuring characteristics of coating films on semiconductor wafers, hard drive disks, or the like.

BACKGROUND OF THE INVENTION

There exists a great variety of methods and systems used in the industry for measuring characteristics of materials, e.g., surface resistance, thickness of coating films and layers applied or laid onto substrates, etc. These methods and systems can be classified in accordance with different criteria and are described in our aforementioned earlier U.S. patent applications Ser. No. 954,550 (2001), Ser. No. 359, 378 (2003); and Ser. No. 434,625 (2003).

A specific group of methods and devices for precision measurement of supper thin films, especially those used in the manufacture of semiconductor devices, is the group based on the use of inductive sensors, in particular those based on so-called resonance technology, in which parameters, e.g., of thin films are measured indirectly through variations in the resonance characteristics of the measured films in comparison to the known characteristics of the same films with known properties.

U.S. patent application Ser. No. 954,550 filed by Boris Kesil, et al. on Sep. 17, 2001 describes a system and method for measuring thickness and thickness fluctuations in conductive coatings with sensitivity as high as several hundred Angstroms. The system consists of an inductive sensor and a proximity sensor, which are rigidly interconnected though a piezo-actuator used for displacements of the inductive sensor with respect to the surface of the object being measured. Based on the results of the operation of the proximity sensor, the inductive sensor is maintained at a constant distance from the controlled surface. Variations in the thickness of the coating film and in the distance between the inductive sensor and the coating film change the current in the inductive coil of the sensor. The inductive sensor is calibrated so that, for a predetermined object with a predetermined metal coating and thickness of the coating, variations in the amplitude of the inductive sensor current reflect fluctuations in the thickness of the coating. The distinguishing feature of the invention resides in the actuating mechanism of microdisplacements and in the measurement and control units that realize interconnection between the proximity sensor and the inductive sensor via the actuating mechanism. The actuating mechanism is a piezo actuator. Measurement of the film thickness in the submicron range becomes possible due to highly accurate dynamic stabilization of the aforementioned distance between the inductive sensor and the object. According to one embodiment, the distance is controlled optically with the use of a miniature interferometer or a fiber-optic proximity sensor, which is rigidly connected to the inductive sensor. According to another embodiment, the distance is controlled with the use of a capacitance sensor, which is also rigidly connected to the inductive sensor. To achieve a certain level of accuracy during environment temperature variations, it is recommended to provide the proximity sensor with a thermo-couple for temperature control.

However, the sensor disclosed in the aforementioned patent application could not completely solve the problems associated with accurate measurement of super-thin films, e.g., of those thinner than 500 Angstroms. This is because the construction of the aforementioned sensor is limited with regard to the range of operation frequencies, i.e., the sensor cannot be used in frequencies exceeding several tens MHz. Furthermore, the system which in this apparatus is used for stabilization of the distance between the sensor and the film is rather complicated, which makes the entire system complex and expensive. But what is most important, the aforementioned complexity delays the system response in each measurement point, so that the system have low measurement efficiency and may not be suitable for used under mass production conditions.

The above problems restrict practical application of the method and apparatus of U.S. patent application Ser. No. 09/954,550 for measuring thickness of very thin films and deviations from the thickness in the aforementioned films. Furthermore, it is obvious that the aforementioned method and apparatus do not allow thickness measurement of non-conductive films. The sensor has relatively large overall dimensions and in many cases comprises a stationary measurement instrument.

In an attempt to solve the problems of the device and method disclosed in U.S. patent application Ser. No. 954, 550, one of the inventors of the aforementioned Patent Application with participation of two new inventors has improved the accuracy of the method and apparatus for measuring thickness of thin films. These improved method and apparatus are disclosed in U.S. patent application No. 359,378 filed by Boris Kesil, et al. on Feb. 7, 2003. The new apparatus consists of an inductive coil having specific parameters, an external AC generator operating on frequencies, e.g., from 50 MHz to 2.5 GHz, preferably from 100 MHz to 200 MHz, and a measuring instrument, such as an oscilloscope, voltmeter, etc., for measuring output of the sensor. The coil has miniature dimensions. The invention is based on the principle that inductive coil of the sensor, active resistance of the coil winding, capacitance of the inductive coil (or a separate capacitor built into the sensor's circuit), and the aforementioned AC generator form a parallel or a series oscillating circuit. The main distinction of the sensor of the last-mentioned invention from all conventional devices of this type is that it operates on very high resonance frequencies or on frequencies close to resonance frequency, preferably within the range of 100 to 200 MHz. In order to maintain the aforementioned high frequency range, the oscillating circuit should have specific values of inductance L (several nano-Henries) and capacitance C (several pico-Farades), and in order to provide accurate measurements, the Q-factor on the above frequencies should exceed 10. It has also been found that on such frequencies the capacitive coupling between the coil of the oscillating circuit and the virtual coil induced in the films acquires the same weight as the mutual inductance between the both coils. In other words, the system can be described in terms of inductive-capacitive interaction between the sensor and the film to be measured. The capacitive-coupling component determines new relationships between the parameters of the film, mainly the film thickness, and parameters of the resonance oscillating circuit. By measuring the parameters of the resonance oscillating circuit, it becomes possible to measure film thickness below 500 Angstroms, as well as other characteristics of the film.

However, in the apparatus of U.S. patent application Ser. No. 359,378 the methods and system for stabilization of the distance between the sensor and the surface of the film being measured remains the same as in the system of first-mentioned U.S. patent application Ser. No. 954,550, and this feature limits significant potentials of the new method and system.

The method and apparatus aimed at still further improvement of properties disclosed in aforementioned U.S. patent application Ser. No. 359,378 are described in new U.S. patent application Ser. No. 386,648 filed by the same applicants as in the previous application on Mar. 13, 2003. This new apparatus allows highly accurate and efficient contactless measurement of film thicknesses below 1000 Angstroms by means of a microwave resonance sensor. The apparatus consists of a special resonator unit in the form of an open-bottom cylinder, which is connected to a microwave swept frequency source via a decoupler and a matching unit installed in a waveguide that connects the resonator unit with the microwave source. The microwave generator is fed from a power supply unit through a frequency modulator that may sweep the frequency of microwaves generated by the microwave generator. All the controls can be observed with the use of a display, such as, e.g., a monitor of a personal computer, which may be connected to the microwaveguide line, e.g., via a directed branched waveguide line for directing waves reflected from the resonator, via a reflected wave detector, an amplifier, a synchronous detector, an A/D converter, and a digital voltmeter. A feedback line is going from a direct wave detector, which is installed in a line branched from the microwaveguide between the decoupler and the matching unit, to the power supply unit. The operation resonance frequency of the resonator sensor unit should be somewhere within the range of swept frequencies of the microwave generator.

In operation, the microwave generator generates electromagnetic waves in a certain sweeping range that induces in the resonator sensor unit oscillations on the resonance frequency with a Q-factor on the order of $10^4$ or higher. A distinguishing feature of the resonator of the aforementioned invention is that the design parameters of the resonator unit allow to achieve the aforementioned high Q-factor without physical contact of the sensor unit with the film to be tested. As the surface of the film to be measured constitutes the inner surface of the resonator unit, even a slightest deviation in conductivity will exert a significant influence on the Q-factor. The Q-factor, in turn, defines the height of the resonance peak. As the conductivity directly related to the film thickness, it is understood that measurement of the film thickness is reduced to measurement of the resonance peak amplitudes. This means that super-high accuracy inherent in measurement of the resonance peaks is directly applicable to the measurement of the film thickness or film thickness deviations.

However, since this resonator is a three-dimensional or special device, the measurement surface may have the minimum value on the order of several square millimeters. In such a construction the diameter of the probe practically cannot be reduced beyond the limit of about 1 mm$^2$.

The problems inherent in the method and device of U.S. patent application Ser. No. 386,648 are solved in another patent application Ser. No. 434,625 filed by the same applicants on May 12, 2003.

The system and method of the last-mentioned patent application are aimed at stabilization of the distance between the sensor coil and the surface of the film being measured by constantly measuring the angle of inclination $\alpha$ of a tangent to the curve that represent dependence of the resonance power of the sensor-film system from the distance between the sensor and the film. The aforementioned angle is calculated plotting the resonance curve of a signal, calculating the area between the resonance curve and the abscissa axis, plotting the curve that represent dependence of the aforementioned area from the distance between the sensor coil and the film, measuring the angle $\alpha$ in a preselected point on the last-mentioned curve, and maintaining the distance between the sensor-coil and the film constant by keeping angle $\alpha$ constant in a any measurement point. Angle $\alpha$ can be selected within the range of 0 to 90° C.

The main distinguishing feature of the method and system of the last-mentioned invention is that the measurements are stabilized without the use of complicated measurement devices for distance control but directly via feedback from each measured resonance signal of the coil-film system, i.e., without the use of an additional distance-control sensor. Furthermore, the invention is based on a procedure, wherein the combined resonance signal curve of the sensor-film system is subjected to a specific analysis, the results of which are used for stabilization of the measurement procedure, as well as for measuring the film parameter.

Although the system and the method of patent application Ser. No. 434,625 made a breakthrough in the measurement of thin films and made the resonance sensor technology (RST) applicable to measurement of wide spectrum of thin film characteristics, their potentials are not yet sufficiently applicable for measuring characteristics of non-conductive materials, such as semiconductors or dielectrics.

Furthermore, none of the methods and systems described above was suitable for optimized measurements of thickness in thin dielectric films and electrophysical surface characteristics of semiconductors.

OBJECTS AND SUMMARY OF THE INVENTION

It is an object of the present invention to provide a system, which is applicable to measurement of characteristics of conductive and non-conductive materials, e.g., of thin non-conductive and conductive films. It is another object of the invention to provide the aforementioned system, which is suitable for using the potentials of the resonance sensor technology to the extent unattainable with the known methods and systems. Another object is to provide the system for measuring thickness of thin dielectric films with high accuracy. Still another object is to provide the aforementioned system, which is suitable for measuring electrophysical surface characteristics of semiconductors.

The system of the invention for measuring characteristics of thin conductive and non-conductive material, such as bulk material or films, is based on the use of a resonance oscillating circuit that incorporates at least two components selected from the group consisting of an inductive coil and a capacitor, which in combination form a sensor that could be approached close to the surface to be measured. The measurement of the film or material characteristics, such as film resistance (film thickness) or a dielectric constant (film thickness) of a non-conductive material, is based on the principle that the sensor is approached to the measured surface at a distance, at which the inductance and capacitance of the sensor generate in the measured material a virtual coil and an additional capacitance, which strongly depend on the characteristics of the measured material. As the sensor approached towards the surface to be measured, the sensor-material system generates a series of resonances having different values of power. One of these resonances can be defined as the so-called full resonance, which is characterized by the maximum value of the power, and hence provides the most accurate measurement and can be used for precisely determining the measurement distance. By comparing the results of measurements with those known from measuring the precalibrated films or materials under the same conditions, it becomes possible to determine the target characteristics of the films or materials. Stabilization of the measurement distance can be carried out by the same methods as described in U.S. patent application Ser. No. 434,625 of the same applicants.

BRIEF DESCRIPTION OF THE DRAWINGS

FIG. 1 is an equivalent circuit of a known measurement system based on the use of a single-component sensor in an oscillating circuit of a sensor-object system.

FIG. 2 is a simplified version of the circuit of FIG. 1 with series connection of capacitance and inductance of the object in the virtual oscillating circuit.

FIG. 3 is a simplified version of the circuit of FIG. 1 with parallel connection of capacitance and inductance of the object in the virtual oscillating circuit.

FIG. 4A is a front view of a known sensor that operates on the basis of a predominantly capacitive coupling between the oscillating circuit of the measurement system and the object to be measured.

FIG. 4B is a known electric circuit that shows connection of the output terminals of the sensor to the measurement circuit that contains a power supply unit, modulator, a.c. generator, etc.

FIG. 5 is a side view of the sensor of FIG. 4A.

FIG. 6 is an equivalent circuit of the sensor of FIGS. 4A and 5.

DETAILED DESCRIPTION OF THE INVENTION

Figure 7:
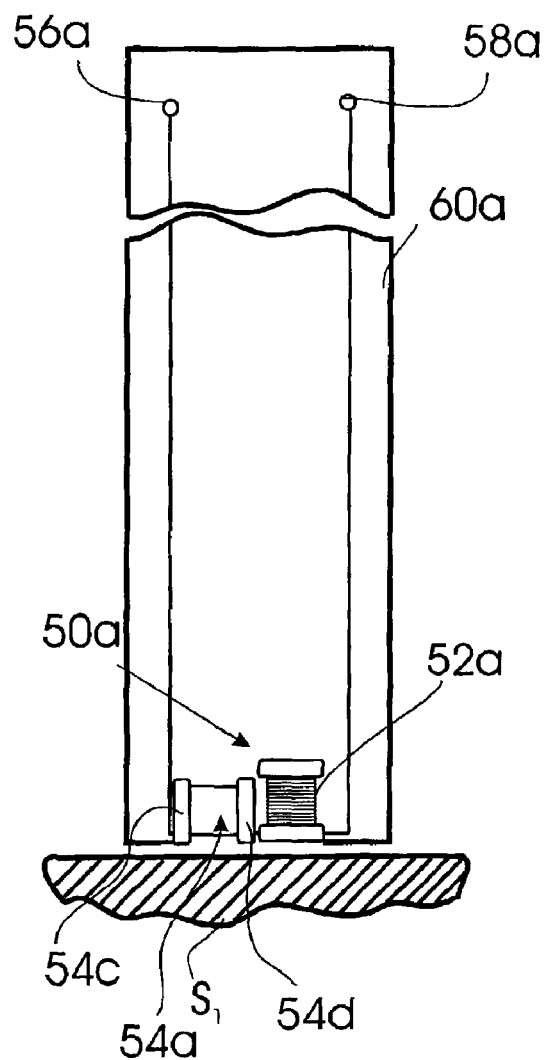
FIG. 7 FIG. 7 is a front view of a sensor made in accordance with one embodiment of the present invention.

For better understanding of the inductive, capacitive, or inductive-capacitive coupling that is generated between the sensor of the invention and the virtual coil generated in the bulk material or in the film to be measured, it would be advantageous to refer to the description of the aforementioned U.S. patent application Ser. No. 434,625 filed by the same application in May 12, 2003. In that application, the equivalent "sensor-film" system was considered as a pair of two oscillation circuits having inductive-capacitive coupling. The first oscillating circuit comprised a closed-loop circuit that contained an inductance coil of the sensor per se, while the second oscillating circuit (i.e., the virtual oscillating circuit) was formed in the measured film and the aforementioned coupling comprised an inductive-capacitive interaction between the sensor and the film.

It is obvious that the sensor coil of the aforementioned coupled electric circuit generates an electromagnetic field that surrounds this coil. If a conductive film is absent or is spaced from the sensor coil at a significant distance, the magnetic lines of the field are not closed through the object, and under such conditions the first oscillating circuit may tune only to the inherent resonance of the sensor coil. In other words, in this case the film-side oscillating circuit does not exist.

As the sensor approaches the conductive film, i.e., the virtual film coil, formed, e.g., by a conductive film on a semiconductor substrate, at some moment the sensor coil begins to interact with a magnetic flow induced by the virtual coil of the film under the sensor coil. This interaction causes a bias in the resonance frequency of the sensor coil, and this bias determines the value of the complex coupling impedance of the "coil sensor"-"object" system. Strictly speaking, in the above-described sensor-object system we have an inductive-capacitive coupling between the sensor coil and the virtual "film coil or object coil" (hereinafter referred to simply as "film coil").

Although both the inductive and capacitive coupling always present in the aforementioned interaction between the sensor and the film or object, for simplicity of description only basically the inductive coupling was considered in aforementioned U.S. patent application Ser. No. 434,625 between the sensor and the conductive film coil. Consideration only of the inductive coupling is justified due to the fact that the behavior of the inductive and capacitive couplings is common in that the amplitude-frequency characteristics of the inductively-coupled circuits and of capacitively-coupled circuits are the same. Furthermore, for a real situation the models of the aforementioned interaction can be considered only qualitatively, as the quantitative consideration becomes practically impossible in view of the extreme complexity of the system, in spite of its apparent simplicity.

An equivalent circuit of the inductively-coupled system disclosed in aforementioned U.S. patent application Ser. No. 434,625 is shown in FIG. 1. In this circuit, it is possible to change the resonance frequency of a sensor oscillation circuit 42 (the left-side circuit in FIG. 1), as well as the magnitude of a coupling between a sensor coil 46 and a film coil 48 in the virtual oscillating circuit 44 (the right-side circuit of FIG. 1). As the currents of the sensor coil 46 and the currents induced in the film coil 48 are directed towards each other, the coils have currents that flow in the opposite directions (FIG. 1).

In this case, equation of the second Kirchhoff's law can be written as follows:

$$\hat{E}_1 = \hat{I}_1 \underline{Z}_{sensor} - \hat{I}_2 \underline{Z}_{coupling} \quad (1)$$

$$\hat{I}_2 \underline{Z}_{film} - \hat{I}_1 \underline{Z}_{coupling} = 0, \quad (2)$$

where $\underline{Z}_{sensor} = R_{sensor} + jX_1$ is a complex impedance of the sensor coil circuit, $\underline{Z}_{film} = R_{film} + jX_2$ is a complex impedance of the virtual "film oscillating circuit", and $\underline{Z}_{coupling} = j\omega M$ is a coupling impedance; $X_1$ and $X_2$ are reactive impedance components, and j is $(-1)^{1/2}$.

It would be convenient to introduce some new definitions, which are the following:

$\underline{Z}^2_{introduced1} = \underline{Z}_{coupling}/\underline{Z}_{film}$—complex impedance introduced into the first circuit, i.e., the sensor oscillating circuit 42, and $\underline{Z}^2_{introduce2} = \underline{Z}_{coupling}/\underline{Z}_{sensor}$—complex impedance introduced into the second, i.e., virtual "film oscillating circuit" 44.

Let us assume the following:

$\underline{Z}_{introduced1} = R_{introduced1} + jX_{introduced1}$ and $$\underline{Z}_{introduced2} = R_{introduced2} + jX_{introduced2} \quad (3)$$

Let us solve the system of the equations for currents:

$$\hat{I}_2 = \hat{I}_1/(\underline{Z}_{coupling}/\underline{Z}_{sensor}) \text{ and } \hat{I}_2 = \hat{E}_1/[\underline{Z}_{sensor} - (\underline{Z}^2_{coupling}/\underline{Z}_{film})]). \quad (4)$$

If the frequency of the input electromotive force $\hat{E}_1$ varies approximately from 0 to 100 MHz, then the following resonances may take place in the "sensor-film" system:

The first specific resonance will occur at frequency ω, under the following condition:

$$X_1 + jX_{introduced1} = 0. \quad (5)$$

In this case, currents $I_1$ и $I_2$ will be at their maximum and will be equal to:

$$I_{1peak} = E_1/(R_{sensor} + R_{introduced1}) \quad (6)$$

$$I_{2peak} = E_1 \cdot [(Z_{coupling}/\underline{Z}_{film})]/(R_{sensor} + R_{introduced1}) \quad (7)$$

The second specific resonance will occur at frequency ω under the following condition:

$$X_2 + X_{introduced2} = 0. \quad (8)$$

In this case, the currents will also be at their maximum:

$$I_{1peak} = E_1 \cdot [(Z_{film}/\underline{Z}_{sensor})]/(R_{film} + R_{introduced2}); \quad (9)$$

$$I_{2peak} = E_1 \cdot [(Z_{coupling}/\underline{Z}_{film})]/(R_{film} + R_{introduced2}) \quad (10)$$

Under the complex impedance conditions, the current $I_{2peak}$ should be chosen so as to satisfy the following condition:

$$I_{1maxpeak} = E_1/2R_{sensor}; \, I_{2maxpeak} = E_1/2(R_{sensor} \cdot R_{film})^{1/2} \quad (11).$$

Complete resonance in the "sensor-film" system occurs when the following two conditions are satisfied:

$$X_1 = X_2 = 0 \quad (12)$$

$$I_{1maxpeak} = E_1/2R_{sensor}; \, I_{sensormaxpeak} = E_1/2(R_{sensor} \cdot R_{film})^{1/2} \quad (13)$$

For complex resonance, however, coupling should have a magnitude which $Z_{sensor}/R_{sensor}$ times greater than that for the complete resonance.

Let us consider the amplitude-frequency characteristic of the inductive coupling between the sensor coil 46 and the film coil 48. Such characteristic can be expressed by the relationship between the current $I_2$ generated in the film coil 48 and the frequency ω or the so-called common imbalance ε, which is defined below. Since in the system of FIG. 4 the sensor coil circuit 42 and the film coil circuit 44 are not the same, let us assume for simplicity of understanding, that both circuits are identical. The following expression can be written for this condition:

$$\underline{Z}_{sensor} = \underline{Z}_{film} = \underline{Z} = R(1+j\epsilon), \quad (14)$$

wherefrom the aforementioned common imbalance ε is determined as a ratio ε=X/R.

Q factor is $Q = \omega_\pi \cdot L/R$, and the coefficient of proportionality k for identical oscillation circuits ($L_{sensor} = L_{film} = L$) is equal to M/L. Let us introduce a ratio $X_M/R$. Based on the previous statement, this ratio can be expressed as follows:

$$X_M/R = \omega_\pi \cdot M/R \cdot \omega_\pi L/\omega_\pi L = M/L \cdot \omega_\pi L/R = kQ \quad (15)$$

The maximal current that can be induced in the virtual film coil for the case of identical oscillating circuits ($R_{sensor} = R_{film} = R$) is equal to $$I_{filmmax} = E_1/2R \quad (16)$$

The rated frequency-amplitude characteristic of the coupled oscillating circuits can be expressed as follows:

$$\frac{I_{sensor}}{I_{sensormax}} = \frac{2kQ}{\sqrt{[1+(kQ)^2-\varepsilon^2]^2+4\varepsilon^2}}. \quad (17)$$

where 2kQ is a coefficient of coupling, the value of which characterizes the mode of operation of the sensor-film system. The meaning of this coefficient will be better understood after considering the explanation given below.

If the coefficient of coupling is low ("weak coupling"), i.e., kQ<<1, then the value of $kQ^2$ can be neglected, and the expression of formula (17) can be simplified to the form of equation (18):

$$\frac{I_{sensor}}{I_{sensormax}} = \frac{2kQ}{1+\varepsilon^2} \quad (18)$$

In this case, the complete resonance cannot be achieved. In an actual system, this condition may exist when the film to be measured is located in a position remote from the coil sensor, in other words, at a distance, at which the coupling exists but in a very weak form. The critical condition will exist at so-called critical coupling (kQ=1), which can be expressed as follows:

$$\frac{I_{sensor}}{I_{sensormax}} = \frac{2}{\sqrt{4+\varepsilon^4}} \quad (19)$$

The frequency-amplitude characteristic has maximum at $\varepsilon=0$.

When the coupling is "strong", i.e., kQ>1, the system may develop the combined, or so-called complex resonance. In this case, the frequency-amplitude characteristic will have two maximums. Thus, as the coefficient of coupling of kQ increases, the picture of the frequency-amplitude characteristic will transfer from a single-resonance shape to a double-resonance shape.

Thus, under conditions of weak coupling, the current maximum occurs on frequency $\omega_\pi$, while under conditions of strong coupling the current curve will have two peaks on frequencies determined from the following equation:

$$\omega_{max1,max2} = \frac{\omega_\pi}{\sqrt{1 \pm \sqrt{k^2-b^2}}}, \quad (20)$$

where b=1/Q.

For the sake of simplicity, the coil-film system was considered for the case when the coil oscillating circuit 42 and the virtual film oscillating circuit 44 are identical. The actual coil-film system will be to some extent different in that under conditions of weak coupling the resonance of the system (the first partial resonance) will decompose into two partial resonances. One of these two partial resonances will correspond to the partial resonance of the sensor coil 46, and the second will correspond to the partial resonance of the film coil 48.

When the coil-film system operates in the range from the aforementioned critical-coupling conditions to the strong-coupling condition, the resonance pattern may vary from complex to complete resonance.

In an actual film-thickness measurement procedure, the transfer from the one-peak shape to the two-peak shape will occur when the sensor approaches the film from a remote position to a close-proximity position. In fact, in the course of measurement, one can observe all four types of resonances, i.e., the first partial resonance, the second partial resonance, the complex resonance, and the complete resonance.

In practice, however, the aforementioned resonances cannot be always distinctly distinguished. This is because the oscillating circuits of the coil circuit and of the virtual film circuit may be significantly different depending on such factors as parameters of the oscillating circuits per se, the coefficient of coupling (magnitude of the gap), power (amplitude) of the a.c. generator signal, location of measurement point, etc. In reality, we will have a common or resulting resonance, in which the share of all aforementioned components will depend on all variable factors listed above.

It should be noted that during measurement the parameters of the coil oscillating circuit (sensor circuit) 42 always remain unchanged, so that the complex impedance of the system will depend only on the distance from the sensor 46 to the film being measured, as well as on the film properties.

Based on the above explanation given to the inductive coupling generated in the measurement system "sensor-film" of the previous patent application, let us consider now the system and method of the present invention. The main distinction of the system and method of the present invention from the previous one is that the aforementioned combined resonance oscillating circuit comprises 1) an oscillating circuit of a combined sensor which comprises at least two components selected from the group consisting of a capacitor and an inductive coil; and 2) a virtual oscillating circuit which is formed by a thin film or by a bulk material capable of interacting with the combined sensor in an inductive-capacitive mode. In the aforementioned interaction, the sensor-object system may generate a sensor-object system resonance, which is characterized by a resonance signal.

In the case of a capacitive coupling, parameters of the film or of the bulk material can be measured in accordance with the circuit shown in FIG. 2 or in FIG. 3. For the circuit of FIG. 2, the coefficient of coupling is calculated with the use of formula (21):

$$k = \sqrt{\frac{C_1 C_2}{C_{sensor\text{-}film}}}, \quad (21)$$

where $C_1 = C_{sensor} \cdot C_{sensor\text{-}film}/(C_{sensor} + C_{sensor\text{-}film})$; $C_2 = C_{film} \cdot C_{sensor\text{-}film}/(C_{film} + C_{sensor\text{-}film})$; $Z_{connection} = 1/j\omega C_{sensor\text{-}film}$; j is the same as defined above.

For the circuit of FIG. 3, coefficient of coupling is calculated with the use of formula (22):

$$k = \frac{C_{sensor\text{-}film}}{\sqrt{\frac{C_{sensor}+C_{sensor\text{-}film}}{C_{film}+C_{sensor\text{-}film}}}}, \quad (22)$$

where $C_1$, $C_{sensor}$, $C_{sensor\text{-}film}$, $C_{film}$, J, and $\omega$ are the same as defined above.

As has been indicated earlier, for inductive and capacitive couplings the amplitude-frequency characteristics of the oscillating circuits are the same, and therefore in practice it is difficult to distinguish between the effects of the inductive and capacitive couplings and to determine the weight of the individual coupling components in the resulting resonance picture. However, the quality analysis conducted above shows that, along with the inductive coupling, the capacitive coupling also plays an important role in the measurement result and can be used for determining parameters of the object to be measured.

FIG. 4A is a front view of one of the sensors of aforementioned previous patent application Ser. No. 954,550 that operates on the basis of a predominantly capacitive coupling between the oscillating circuit of the measurement system and the object to be measured. FIG. 4B is an electric circuit that shows connection of the output terminals of the combined sensor to the measurement circuit that contains a power supply unit, modulator, a.c. generator, etc. FIG. 5 is a side view of the sensor of FIG. 4A, and FIG. 6 is an equivalent circuit of the sensor of FIGS. 4A and 5.

As can be seen from FIGS. 4A to 6, the sensor, which in general is designated by reference numeral 50 comprises an oscillating circuit that contains an inductive coil 52 connected in series with a capacitor 54. In FIG. 4A, reference numerals 56 and 58 designate power input contacts for connection of the inductive coil 52 and capacitor 54 to the appropriate components of the electric circuit of FIG. 4B. The circuit of FIG. 4B is based on measuring direct current obtained by rectifying harmonic or non-harmonic audio signals in the range of 400 Hz to 25 KHz and by amplifying the obtained DC signal with the use of an amplifier 55 (OP-77). This signal is then measured by means of an analog or digital voltmeter 57 with subsequent processing on a computer (not shown). In the a.c. generator 59, the sinusoidal signals of the frequency to be measured are generated by unit 61 (ICL8038). The circuit also contains a modulator 63, a demodulator 65, and an audio-frequency amplifier 67. In FIG. 4B, symbols A and B designate electrical contacts for connection of the aforementioned contacts 56 and 58 of the sensnor 50 shown in FIGS. 4A and 6.

The sensor 50 may be made in the form of a chip with the elements mounted on a common substrate 60 and may be enclosed in a casing, not shown. However, the capacitor 54 should have an external position that would allow positioning thereof in a close proximity to an object S, which is made, e.g., of a dielectric material characterized by a specific value of the dielectric constant $\epsilon$. When during operation the sensor 50 approaches the surface of the object S, the resonance frequency of the sensor-object system is changed under the effect of the capacitance of the object S, which, in turn, depends on the value of $\epsilon$. Variation in the value of $\epsilon$ is used for determining the measured parameter. The results of the measurements are compared with those obtained for reference materials of the same type with known values of the parameter to be measured.

The main disadvantage of the sensor 50 of FIGS. 4A–6 is that it is not sufficiently universal as it is efficient for measuring parameters mainly of non-conductive films.

As shown in the equivalent circuit of FIG. 6, the system may incorporate a variable capacitor 49 for adjusting the resulting resonance frequency of the measurement circuit during measurement.

Figure 8:
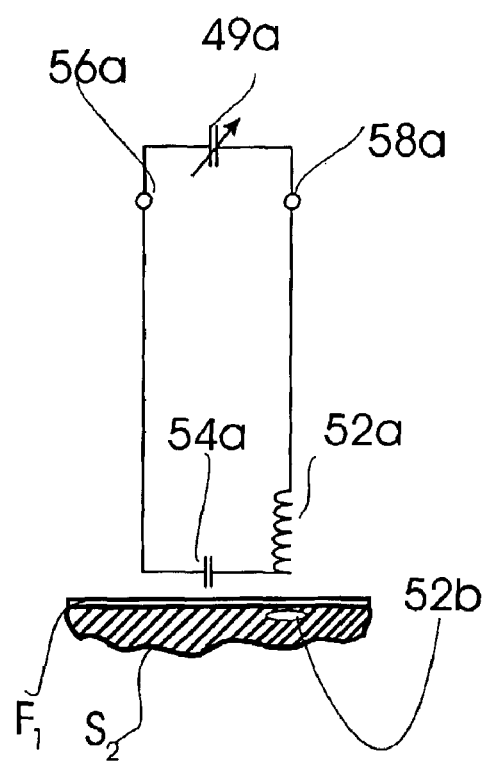
FIG. 8 is an equivalent circuit of the sensor of FIG. 7.

FIG. 7 is a front view of a sensor made in accordance with one embodiment of the present invention, and FIG. 8 is an equivalent circuit of the sensor of FIG. 7. Since the measurement system of the invention is similar in its structure to the one used in the known apparatus of the aforementioned previous patent application, similar elements of the system of FIGS. 7 and 8 will be designated by the same reference numerals with an addition of letter "a".

As can be seen from FIGS. 7 to 8, the sensor, which in general is designated by reference numeral 50a, comprises an oscillating circuit that contains an inductive coil 52a connected in series with a capacitor 54a having two capacitor terminals 54c and 54d. In an actual circuit, the capacitor 54a may comprise a surface-mount multiplayer ceramic chip capacitor, e,g, type NPO, produced by Panasonic Co., Japan. This capacitor may be as small as 0.6×0.3×0.15 mm at a capacity from fractions to several pF. Capacitors of even smaller dimensions are commercially available. Wire-wound surface-mount inductive coils produced by the same company [Types 0201] may have dimensions as small as 0.5×0.5×1 mm. Non wound inductive coils may have even smaller dimensions (0.3×0.3×0.6 mm). These super-miniature inductive coil may have inductance on the order of less than 1 nH to several nH. The combination of the aforementioned capacitors and inductive coils may form a composite sensor as small as 1 mm or less. For composite sensors fit into the point probe of the diameter smaller than 1 mm, the component capacitor and/or coil should be based on the planar semiconductor technique. It is assumed that the composite sensors with aforementioned capacitances and inductances may develop the inherent resonance frequency from tens MHz to several GHz.

In FIG. 7, reference numerals 56a and 58a designate power input contacts for connection of the inductive coil 52a and capacitor 54a to aforementioned contacts A and B of the power supply and measurement system (FIG. 4B).

The sensor 50a itself may be made in the form of a chip with the aforementioned components mounted on a common substrate 60a (FIG. 7) and may be enclosed in a casing, not shown. However, the inductive coil 52a and the capacitor 54a should have an external position that would allow positioning thereof in a close proximity to an object to be measured. In FIGS. 7 and 8 this object is shown in the form of a bulk semiconductor or a dielectric material S1, and in the equivalent circuit of FIG. 8 the object is shown in the form of a thin dielectric film F1 characterized by a specific value of the dielectric constant $\epsilon$ on a conductive substrate S2.

Thus, it can be seen that, in contrast to the measurement systems of aforementioned U.S. patent application Ser. No. 954,550 where the element of the interaction with the object comprises a single inductive coil or a single capacitance, the measurement system of the present invention has a composite sensor that comprises a combination of at least two elements selected from the group consisting of a capacitor (54a in FIGS. 7 and 8) and an inductive coil (52a in FIGS. 7 and 8). These capacitor 54a and inductive coil 52a are mounted so close to each other that they can fit into a small measurement tip having a diameter of about 1 mm or less. When the sensor 50a is moved close to the object, e.g., the dielectric film F1 on the conductive substrate S2, the inductive coil 52A induces in the conductive substrate S2 of FIG. 8 a virtual current turn 52b, which, in turn, has a magnetic interaction (mutual induction) with the sensor coil 52a. Furthermore, on normal operation frequencies (hundreds of MHz), the virtual turn 52b develops a capacitive coupling with the oscillation circuit of the sensor 50a. On the other hand, the conductive substrate S2 with the dielectric film F1 will affect the capacitance of the capacitor 54a. Thus, it was shown that electrophysical characteristics of the sensor-object systems strongly depends on the distance between the sensor and the object. In fact, depending on the measurement distance from the object to the sensor 50a in the course of measurement, one can observe a sequence of resonances, i.e., at least the first partial resonance, the second partial resonance, the complex resonance, and the complete resonance. Qualitatively, the above phenomena were described earlier with reference to the equivalent circuits of FIGS. 2 and 3 and to the analysis of the couplings occurred under the above conditions. In complete resonance, the measurement system of the invention according to the embodiment of FIGS. 7 and 8 may have a Q-factor which is much higher than the Q-factor attainable with the known system of FIGS. 4–6. This means that the measurement system of the invention possesses much higher sensitivity and measurement accuracy than the aforementioned known system. By analyzing variations in the resonance signals obtained by the measurement system, it is possible to determine characteristics of the test material by comparing the results of measurements and deviations with the reference data.

It is understood that if the object is a non-conductive film on a non-conductive substrate or on a non-conductive bulk material, the sensor 50a of the invention will work as the prior-art sensor 50 of the oscillating circuit of FIGS. 4–6.

Figure 9:
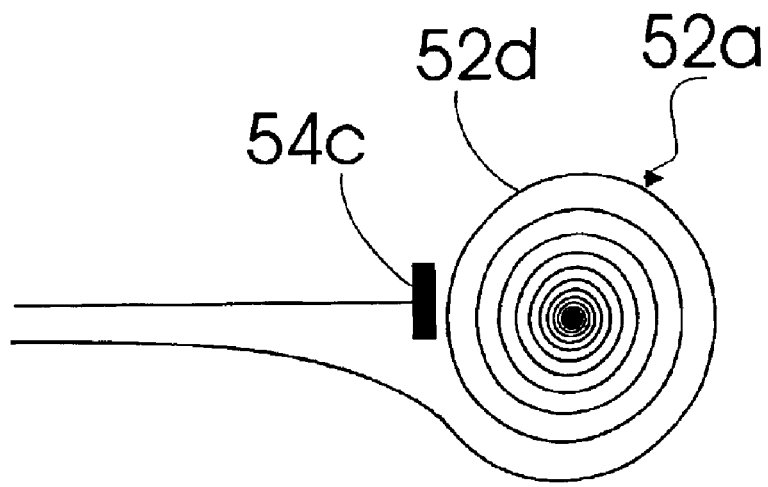
FIG. 9 is a view illustrating one of the arrangements of the capacitor and the coil in the composite sensor of FIGS. 7 and 8, the capacitor plate being arranged tangentially to the outermost turn of the spiral coil.
Figure 10:
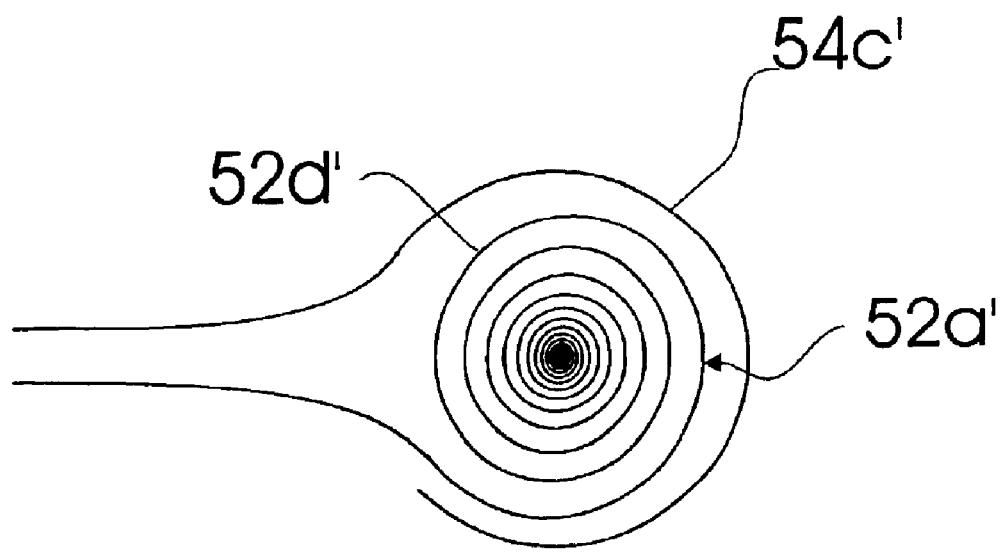
FIG. 10 is a view illustrating another arrangement of the capacitor and the coil in the composite sensor of FIGS. 7 and 8, the capacitor plate being formed as a circular turn embracing the outermost turn of the spiral coil.

The equivalent circuit of FIG. 8 also may be realized in the form shown in FIGS. 9 and 10. In FIG. 9, the inductive coil 52a is made in the form of a flat spiral coil with a free (electrically open) inner end of the spiral turn, which may be assumed as one of the capacitor plates, e.g., 54d, while the other capacitor plate is shown in FIG. 9 as a plate 54c which interacts in a capacitive manner with the coil 52a. For example, the spiral coil may have an outermost turn 52d, and the capacitor plate 54c may be spaced from the outermost turn 52d and arranged tangentially thereto. The plate 54c is coplanar to the flat coil 52a. The overall dimensions of the sensor shown in FIG. 9 may not exceed 0.5 mm, preferably 100 microns. It is understood that in the course of measurements the flat spiral turn 52a is arranged parallel to the surface of the object, e.g., S1 (FIG. 7).

Another arrangement of the sensor elements of the equivalent circuit of FIG. 8 is shown in FIG. 10. The arrangement of FIG. 10 differs from that of FIG. 9 by making the plate 54c of the capacitor in the form of an open-loop ring 54c' that surrounds the outermost spiral turn 52d' of the flat spiral coil 52a'. It is understood that the flat spiral coil 52a' and the open-loop ring 54c' are complanar.

Figure 11:
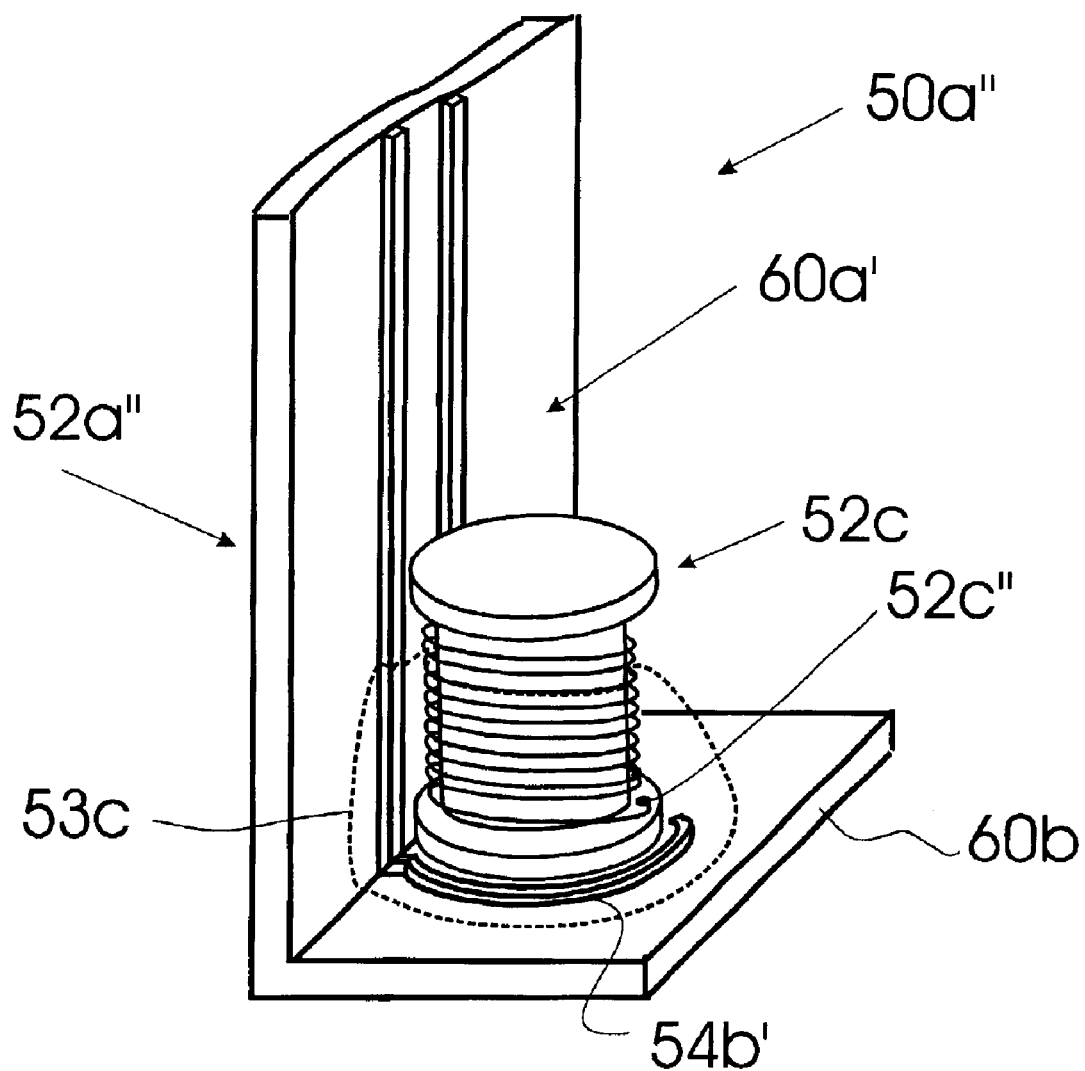
FIG. 11 is still another structural modification of the oscillating circuit that contains the sensor of the invention and corresponds to the equivalent circuit shown in FIG. 8.

FIG. 11 is still another structural modification of the oscillating circuit that contains the sensor of the invention and corresponds to the equivalent circuit shown in FIG. 8. In this modification, the inductive coil 52c (FIGS. 11 and 12) is supported by a horizontal portion 60b of a L-shaped board 60a' and has its lower end 52c'' free of electrical contact (FIG. 11). The end 52c'' of the coil 52c is surrounded by an open flat ring electrode 54b' supported by the horizontal portion 60b. The flat ring electrode 54b' and the lower end 52c'' of the coil 52c form a capacitor which in combination with the inherent capacitance of the inductive coil 52c defines the capacitance of the resonance oscillating circuit. In the measuring system, the sensor 50a'' formed by the inductive coil 52c and the flat ring electrode 54b' operates in the same manner as the capacitive sensor 50a of the oscillating circuit of FIG. 7.

Figure 12:
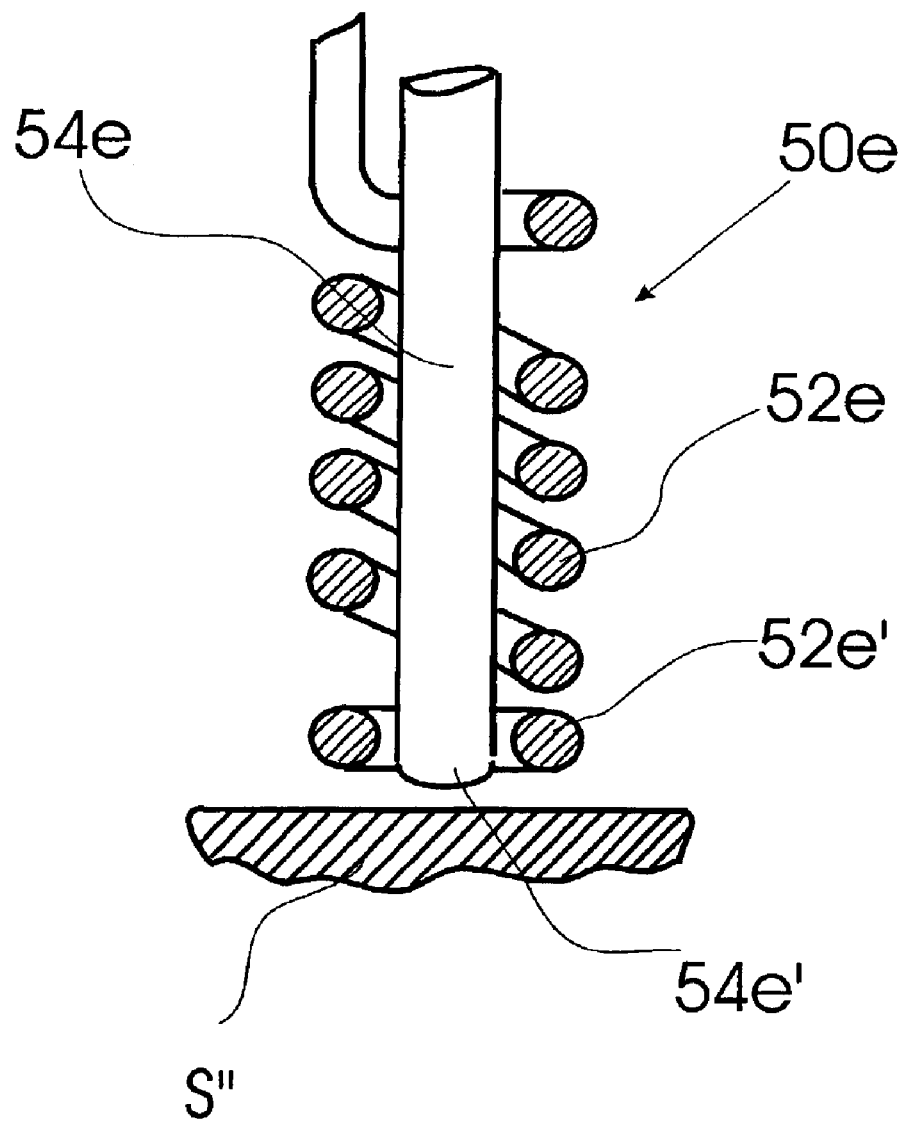
FIG. 12 illustrates another modification of a composite sensor of the invention in the form of a helical inductive coil with a free electrically non-connected end and a rod-like electrode inserted into the coil for use as a capacitor electrode.

FIG. 12 illustrates another modification of a sensor 50e in which reference numeral 52e designates a helical inductive coil with a free electrically non-connected end 52e', and reference numeral 54e' designates a lower end of a rod-like electrode 54e. In this modification, the capacitance of the oscillating circuit is formed by the inherent capacitance of the coil 52e and the capacitance of the electrode 54e. The lower end 54e' and the lowermost open turn of the coil 52e' comprise the sensitive potion of the sensor which is intended for inductive-capacitive interaction with the object S''. The principle of operation of the sensor 50e is the same as described above for sensors of FIGS. 8–11. However, the dimensions of the sensitive portion of the sensor 50e may not to exceed 30 mincrons.

Figure 13:
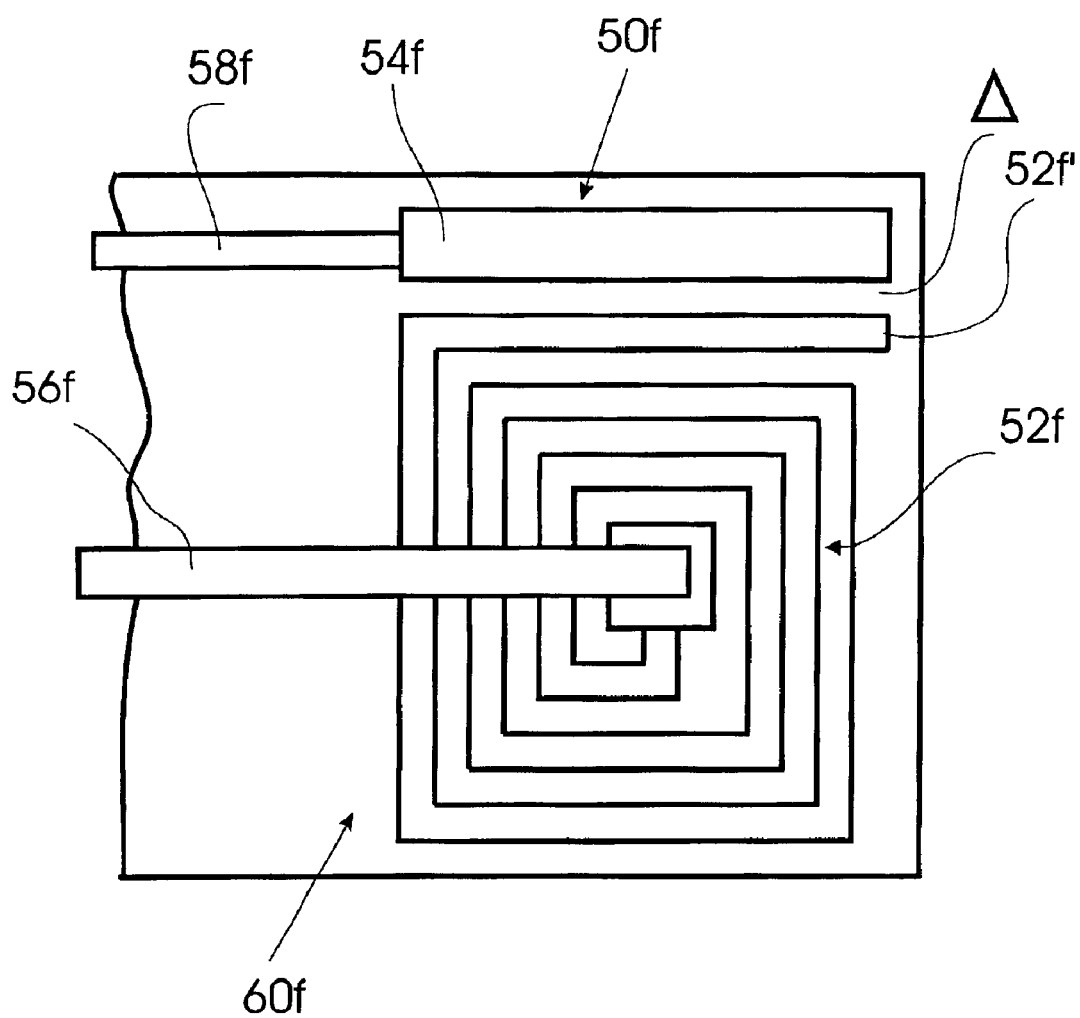
FIG. 13 shows a topology of a composite inductive-capacitive sensor of the invention lithographically formed as a pattern on a silicon membrane.

FIG. 13 shows a topology of an inductive-capacitive sensor 50f lithographically formed as a pattern on a silicon membrane 60f. The sensor 50f consists of an electrode 54f and a flat spiral coil 52f. The last open turn 52f' of the spiral coil 52f is arranged parallel to the electrode 54f and form therewith a small gap A. The a.c. signal from the generator (FIG. 4B) is applied to the innermost end of the spiral coil 52f via a wire 56f and to the electrode 54f via a wire 58f. The principle of operation is the same as described above.

Figure 14:
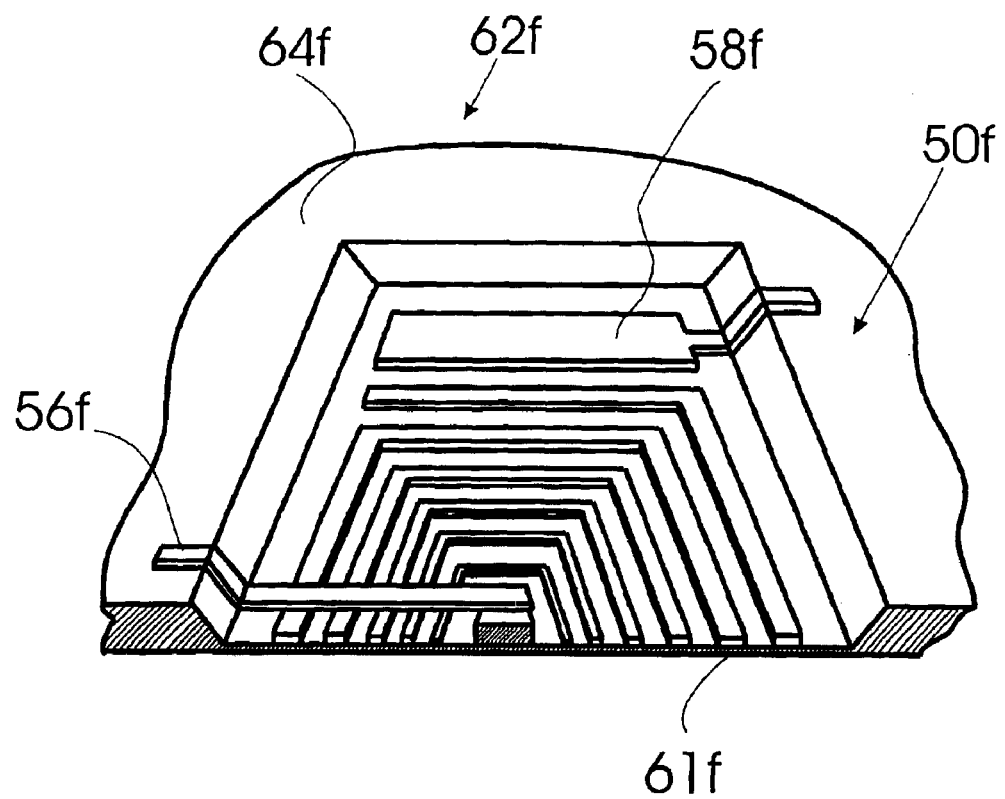
FIG. 14 shows an example of structural realization of the sensor of FIG. 13 on a thin silicon membrane.

FIG. 14 shows an example of structural realization of the sensor 50f (FIG. 13). The support 64f may comprise a horizontal part of the aforementioned L-shaped portion 60b of FIG. 11, and can be made of silicon. All elements of the sensor shown in FIG. 13 are placed in vias etched in the surface of the silicon substrate 64f. The conductive elements, such as electrodes 50f and the turns of the coil 52f (FIG. 13) are formed on the bottom of the etched vias. In other words, the sensitive portion of the sensor may be formed as a very thin silicon membrane 61f with electrodes and turns of the coil on the bottom of the membrane. This means that the sensitive elements of the sensor 50f can be positioned at a very small distance from the surface of the measured object. In other words, the sensor is suitable for measurement under conditions where the sensitive elements of the sensor can be spaced from the measured object at a distance of 10 to 20 microns for achieving the conditions of complete resonance, which may not be attainable with the use of other similar sensors.

Figures 15, 16:
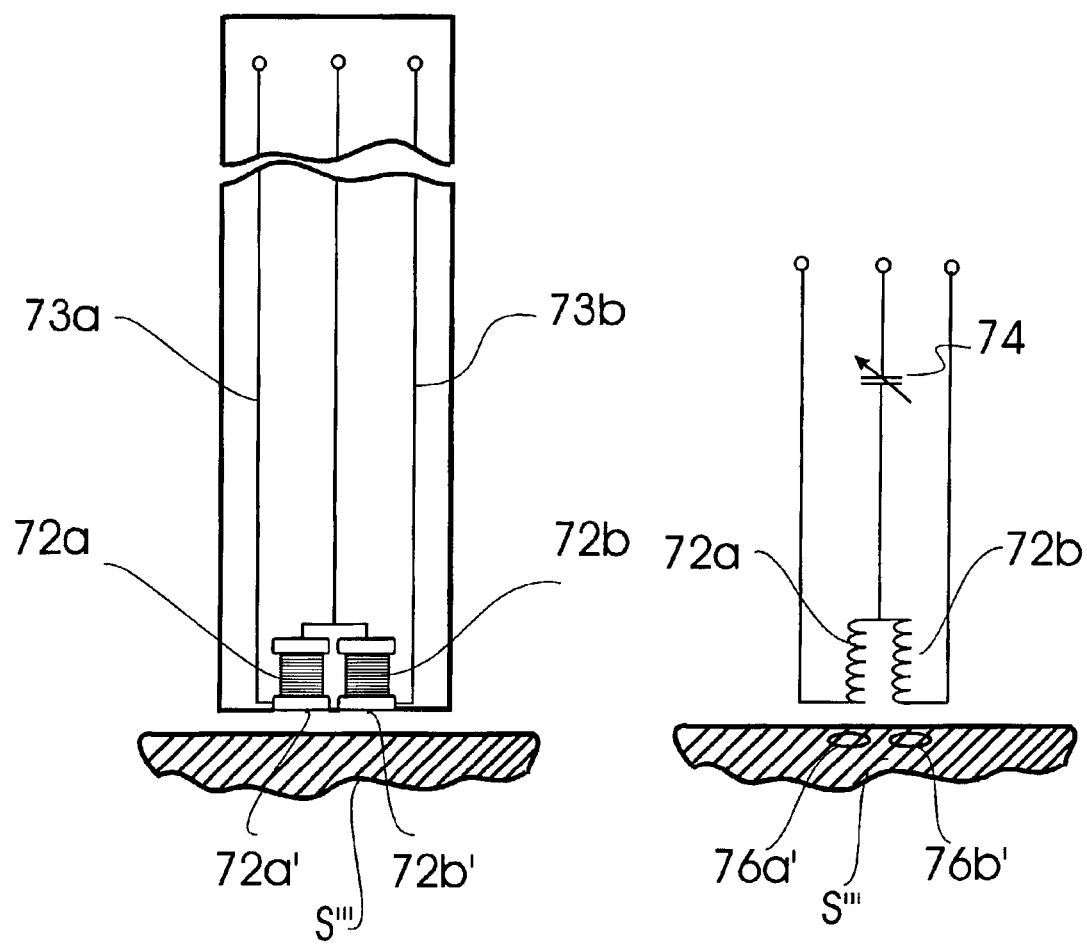
FIG. 15 is affront view of a composite sensor of another embodiment of the invention, in which the sensor is composed of two blocked inductive coils.
FIG. 16 is an equivalent circuit of the sensor of FIG. 15.

FIG. 15 illustrate another embodiment of the measurement system of the invention, in which a sensor 70 also is composed of at least two elements, i.e., two inductive coils 72a and 72b. The lower ends 72a' and 72b' of the inductive coils 72a and 72b are electrically connected to to terminal B of the circuit shown in FIG. 4B. The opposite ends of the inductive coils 72a and 72b are connected to each other and to terminal A of the circuit shown in FIG. 4B. The inductive coils 72 and 72b are located on the side of the composite sensor, which is intended for interaction with the object S'''. Reference numeral 74 designates a variable capacitor that can be used for adjusting the frequency of the oscillating circuit formed by the inductive coils. When, in the course of measurements the coils are energized from an a.c. generator of a sufficieintly high frequency (e.g., higher than 100 MHz), but the object S''' is absent or is located at a remote distance, a capacitive coupling is induced between the closely spaced coils 72a and 72b (see FIG. 16 that illustrate positions of closely spaced coils 72a and 72b). It is understood that under these conditions the inherent resonance can be achieved in the oscillating circuit even without participation of the object. When the sensor 70 is approached to the surface of the a film F''' which is supported, e.g., by a conductive substrate S''', the sensor 70 generates in the conductive substrate S''' virtual coils 76a and 76b. As a result, and inductive coupling occurs between the virtual coils 76a, 76b and the inductive coils 72a and 72b of the sensor 70. Furthermore, as has been explained earlier, the aforementioned inductive coupling will be accompanied also by capacitive couplings between the facing ends of the coils 76a, 76b and the virtual coils 76a and 76b. The coupling pattern that occurs under such conditions could be characterized by more than four types of measurable resonances mentioned above and suitable for measuring characteristics of the object.

All composite sensors have component sensors encapculated or embedded in a plastic, glass, or another sealing material that covers the sensor elements. For example, in FIG. 11, the drop of the sealing material that covers the capacitor component 54b' and a part of the coil 52c is designated by reference numeral 53c. It is understood that the sealing materials of different types and configuration can be used in conjunctions with all other embodiments.

Figure 17:
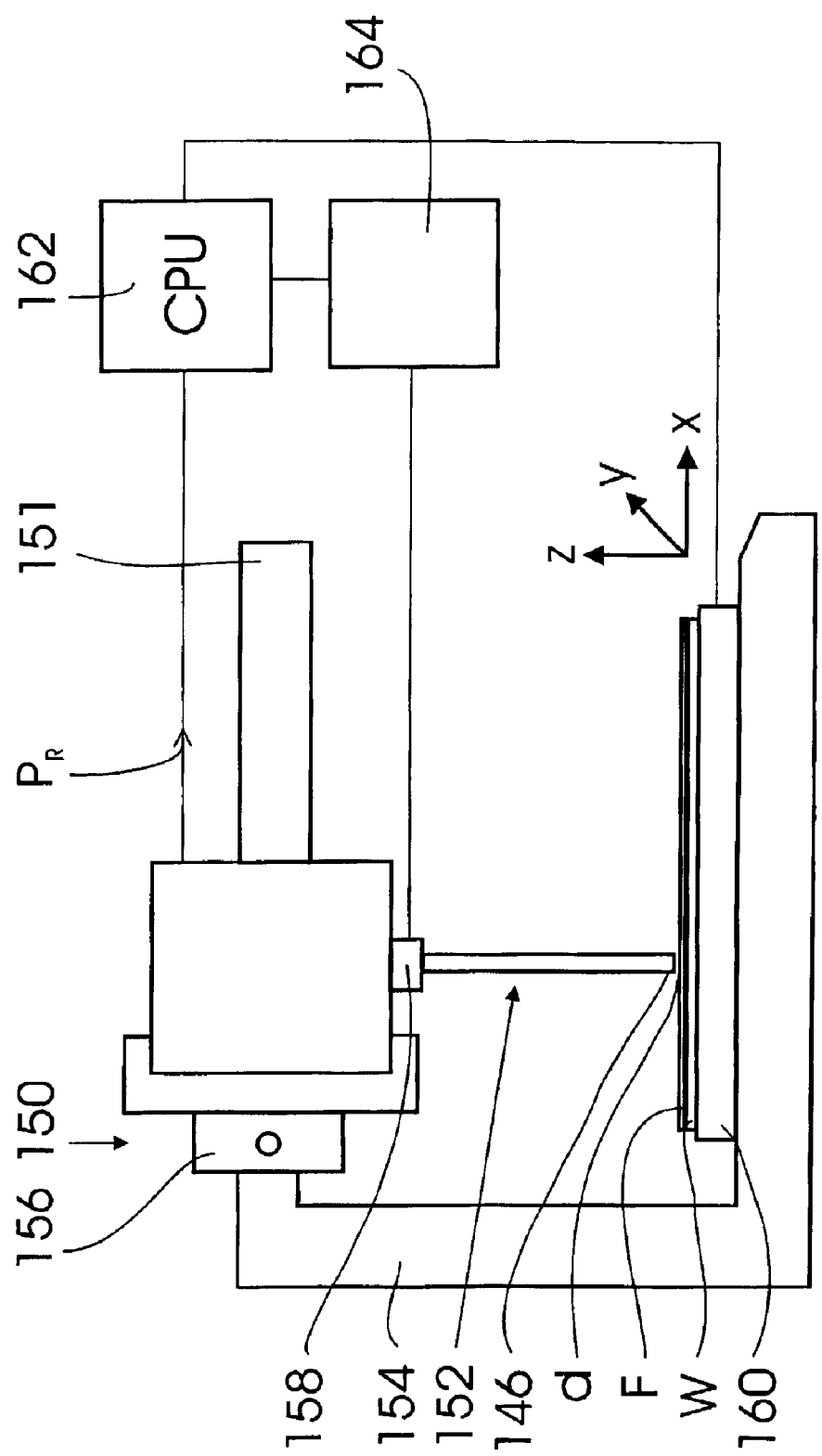
FIG. 17 is a general schematic view of the entire measurement system of the invention.

In an actual construction of the apparatus used in the distance stabilization system of the invention, which is shown in FIG. 17, a measurement head 150 that contains the coil oscillating circuits with sensors shown in FIGS. 7–16, is supported by the mounting frame 154. Position of the sensor, e.g., a composite sensor 50a of FIGS. 7 and 8, can be adjusted by means of a micro-adjustment mechanism, e.g., a screw 156 for rough adjustment in the vertical direction and by a piezo actuator 158 for fine tuning of the vertical position. With the use of the piezo actuator, accuracy of micro-adjustment for positioning the tip of the rod 152 and hence of the sensor, e.g., the aforementioned sensor 50a with respect to the surface of the film F, may be as small as 1 micron, or less. The distance "d" between the tip of the rod 152 and the surface of the film F may be within the range of about 10 to 300 microns. In addition to the vertical movement (axis Z), the measurement head 150 can be driven in a horizontal direction (axis X), e.g., by means of a pinion-and-rack mechanism 151. In order to provide measurement in any point of the film F, the object, e.g., a semiconductor wafer W, is supported by a rotating platform 160.

All motions and measurement operations are controlled from a central processing unit (CPU) 162, which receives signals from the a.c. generator (not shown in FIG. 17) and is connected to drives of the vertical, horizontal motions of the measurement head 150, as well as to rotary drive of the platform 160 and to the power supply 164 of the piezo actuator 158.

Let us consider operation of the apparatus of FIG. 17 in the system for measuring dielectric constant $\epsilon$ of a thin dielectric film F1 on a conductive substrate S2 (FIG. 8). The substrate S2 with the film F1 to be measured is installed and fixed on the rotating platform 160. The oscillating circuit that contains the composite sensor 146 is energized at a frequency of an inherent resonance, and the characteristics of the inherent resonance of the oscillating circuit of the sensor are measured. These characteristics may be represented by an amplitude and frequency of the inherent resonance. When the oscillating circuit of the sensor 146 was energized, an inductive-capacitive electromagnetic coupling occurred between the aforementioned two components of the composite sensor. As has been shown above, the aforementioned two components of the composite sensor may comprise an inductive coil and a capacitor, or two inductive coils. In the last case, the capacitor is represented by an inherent capacitance of each of the coils and a mutual capacitance between two inductive coils.

The measurement head 150 is then approached towards the film with the use of the screw 156 for rough adjustment, and then by the piezo actuator 158 for fine tuning of the vertical position of the composite sensor 146 relative to the surface of the film F1. Position of the measurement point in the horizontal direction is adjusted by means of the pinion-and-rack mechanism 151 in combination with rotation of the platform 160. The aforementioned movement of the sensor, e.g., the sensor 50a (FIGS. 7 and 8) in the horizontal plane should be carried out with positioning accuracy of several microns. This can be achieved with the use of a known precision positioning mechanism such as step motors that can be controlled by means of the CPU 162.

Approaching of the sensor 146 to the aforementioned material is continued until a combined sensor-material oscillating circuit occurs due to inductive-capacitive electromagnetic coupling between the composite sensor 146 and the material (in this case, film F on substrate W). When in the aforementioned movement, a resonance occurs in the sensor-material oscillating circuit, the characteristics of this resonance are measured and compared with the characteristics of the inherent resonance of the oscillating circuit that contains the composite sensor 146. Characteristics of the material, e.g., the dielectric constant $\epsilon$ o the non-conductive film F1, are determined by comparing the resonance characteristics of the sensor-material system with the same characteristics of the inherent resonance of the sensor-containing circuit. More specifically, the difference between both characteristics is matched with known reference data.

Figure 18:
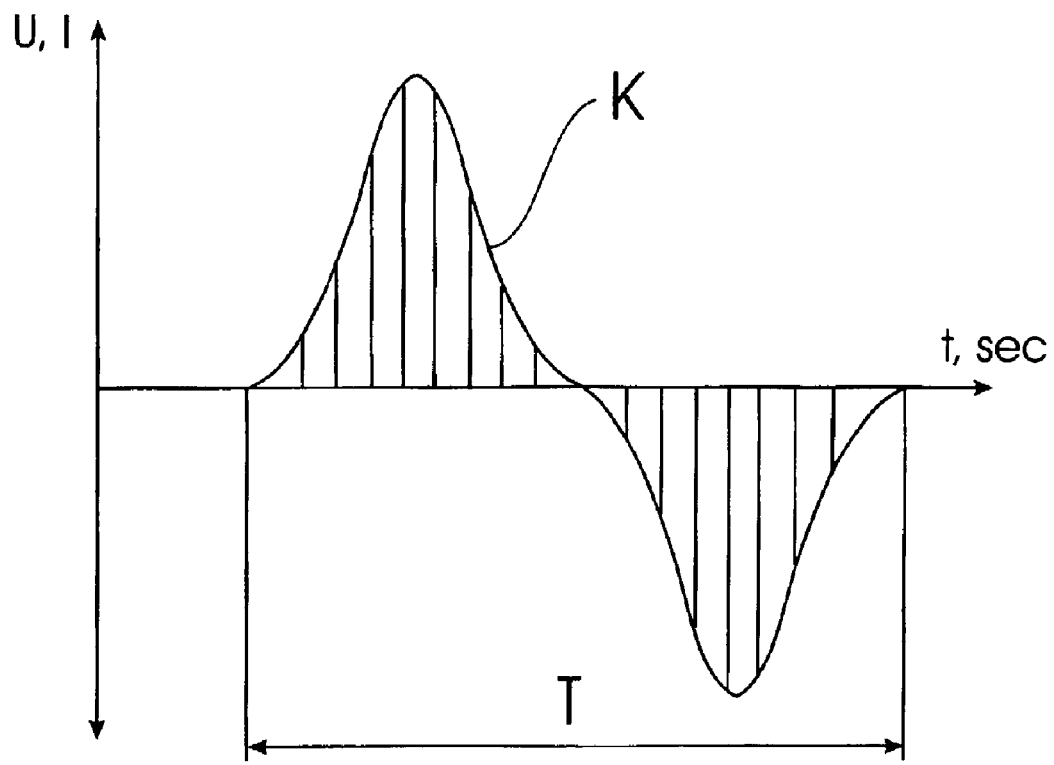
FIG. 18 is a development of the resonance frequency signal generated by the sensor-object system observed on an oscilloscope.

The following description relates to the procedure of excitation of the sensors and stabilization of the distance "d" between the composite sensor and the material being measured. This procedure of stabilization was described in detail in aforementioned U.S. patent application Ser. No. 434,625, while the procedure of excitation of the sensor is described in detail in aforementioned U.S. patent application Ser. No. 359,378. The generator-modulator unit 59, 63 (FIG. 4B) located in the measuring head 150 generates a voltage signal having a carrier frequency of 50 to 200 MHz and modulated by a voltage signal with the frequency in the range of 400 Hz to 20 KHz. The modulated carrier signal is supplied to the sensor coil and is tuned to the resonance of the sensor coil oscillating circuit. The measurement signal is an amplified resonance signal, which is sent to the CPU 162. In general, the aforementioned signal may represent frequency-amplitude characteristics, such as voltage versus frequency, current versus frequency, or power versus frequency of the combined oscillating circuit formed by the sensor-film system. Let us consider, for the sake of example, the frequency-amplitude characteristics presented by the voltage-versus-frequency curve, which is shown in FIG. 18. In fact, this graph of FIG. 18 is development of the resonance frequency signal generated by the sensor-film system, e.g., of the type shown in FIGS. 7 and 8, and observed on an oscilloscope (not shown). As can be seen from FIG. 18, the measurement signal has a shape of a periodic function. The shape shown in FIG. 18 is a typical one but in reality may be distorted. The area between the curve K and the abscissa axis t (the hatched area in FIG. 18) is considered as a parameter that characterizes the power of resonance ($S_{resonance}$) of the measurement signal during period T. The aforementioned area is calculated by the CPU 162 (FIG. 17). it is understood that depending on the distance "d", the power of the resonance signal $S_{resonance}$ and hence the aforementioned area will vary. This dependence is shown in FIG. 7, which is "d" versus $S_{resonance}$ curve. Such measurements are carried out and registered by the CPU 162 in each fixed measurement point of the step-by-step movement performed by the measurement head 150 under control of the aforementioned piezo actuator 158. The aforementioned step-by-step downward movement toward the film is accompanied by variations in the resonance pattern with transfer from the first partial resonance mode to the complete resonance mode, as has been described above. Although the system of the invention will work in any resonance mode, it is more advantageous to operate in the complete resonance mode, which provides the most powerful signal and the highest accuracy.

Figure 19:
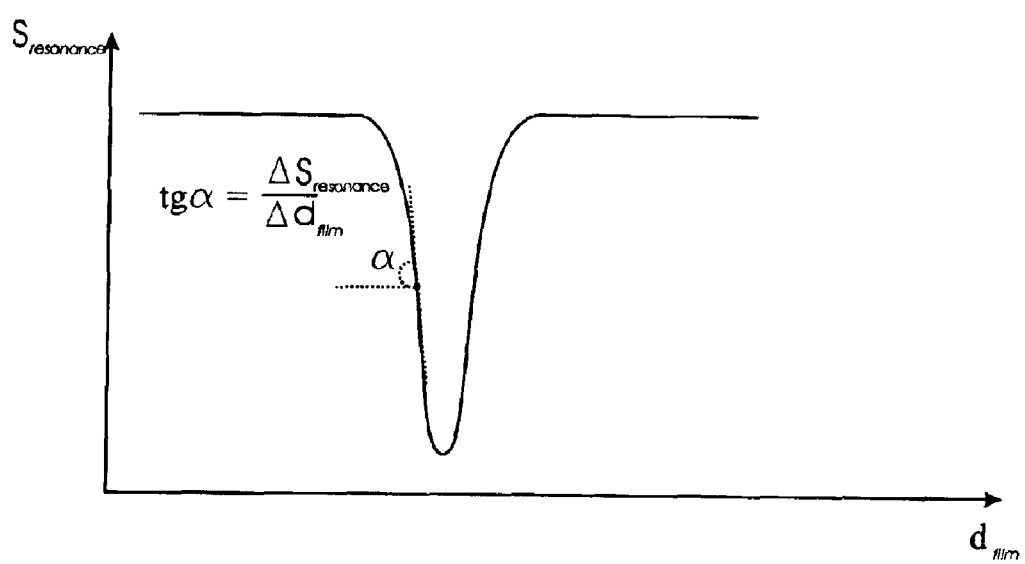
FIG. 19 is a curve that shows dependence of the resonance power on the distances from the sensor to the object.

The applicants have found that the most convenient method for stabilization of distance "d" is to constantly measure the angle of inclination $\alpha$ (FIG. 19) of a tangent to the function curve of FIG. 19 and to adjust the precise vertical position of the composite sensor relative to the surface of the film for maintaining angle $\alpha$ constant in any measurement point. Position of the point on the curve where the angle of the tangent is measured is arbitrary for the first measurement cycle and is assumed as a reference for the subsequent measurement points.

Thus, the method of the invention for stabilization of the distance "d" consists of continuously measuring angle $\alpha$ on the aforementioned curve of FIG. 19 and maintaining this angle constant by adjusting distance "d" with the use of the piezo-actuator 152. It is understood that the simple step of stabilization described in the previous sentence, in turn, is based on the phenomenon of the complex resonance that occurs in the sensor-object system with the virtual oscillating circuit formed by the object, when the object is located in close proximity to the composite sensor.

As has been mentioned above, angle $\alpha$ is selected arbitrarily by the operator and may be within the range of 0 to 90° C. After the angle is chosen, its value is inputted to the CPU 162 (FIG. 17) and is used as a starting and reference point of distance measurements. This is because, as has been shown above, angle $\alpha$ is in a rigid correlation with the value of the distance "d". It is known that a semiconductor substrate practically always has some sagging, which may reach 30 to 50 $\mu$m. However, in spite of such sagging, the system of the invention will constantly stabilize the distance "d", as the absolute value of this distance is always maintained constant, irrespective of the position of the substrate.

In other words, the composite sensor traces the surface of the film and follows it in a continuous mode with resolution of the stepper-motor steps.

Thus, the sequence of operation of the system shown in FIGS. 7–17 can be summarized as follows:

1. Finding approximate value of the resonance in the sensor-film system.
2. Finding an approximate distance at which the full resonance can be achieved.
3. Selecting appropriate angle α and inputting the value of this angle into the CPU.
4. "Scanning" the surface of the film from one measurement point to the next measurement point with stabilization of angler α in each point.

It has been found that frequency-amplitude characteristics of the system with a capacitive coupling are essentially the same as of the system of previous patent application Ser. No. 434,625, with the difference that instead of a single inductive sensor or a single capacitive sensor, the system of the invention utilizes a composite sensor that contains at least two components selected from an inductive sensor and a capacitive sensor. These component sensors interact with the object to be measured and, depending on the type of the object, may develop a purely inductive, purely capacitive, or an inductive-capacitive coupling with the object.

The method of the invention for measuring characteristics of materials comprises the steps of:

providing an oscillating circuit comprising a composite sensor in the form of a combination of at least two components selected from the group consisting of a capacitor and an inductive coil, the aforementioned at least two components being electrically connected to each other;

energizing the aforementioned oscillating circuit and the composite sensor to cause an inductive-capacitive electromagnetic coupling between the aforementioned at least two components;

generating an inherent resonance in the aforementioned oscillating circuit and measuring characteristics of the inherent resonance;

approaching the composite sensor to the aforementioned material until a combined sensor-material oscillating circuit occurs due to an inductive-capacitive electromagnetic coupling between the composite sensor and the material;

continuing the step of approaching until a resonance occurs in the aforementioned sensor-material oscillating circuit;

measuring characteristic of the obtained system resonance of the combined sensor-material oscillating circuit;

comparing the characteristics of the inherent resonance with the characteristics of the system resonance and determining a characteristic difference; and ; and determining characteristics of the aforementioned material by matching the resonance difference with known reference data for the same material.

It has been shown that the invention provides a method and system which are applicable to measurement of characteristics of conductive and non-conductive materials, e.g., of thin non-conductive and conductive films. The aforementioned system is suitable for using the potentials of the resonance sensor technology to the extent unattainable with the known methods and systems. Furthermore, the system and method of the invention are suitable for measuring electrophysical surface characteristics of semiconductors with high accuracy.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the number of blocked components selected from capacitors and inductive coils may exceed two. The coils and capacitors may have structures different from those shown in FIGS. 7–16 and, for most efficient interaction with the object, may generate electromagnetic fields with different special distribution patterns. In addition to the Panasonic group of companies, the microcoils and micro-capacitors can be selected from commercially produced items of many other companies. The coils and capacitors of the composite sensors may be encapsulated with different arrangements and mutual positions. It is also obvious that the schematic presentation of the measurement system shown in FIG. 17 may be realized in different designs, e.g., in a modular form, with an orthodox coordinate system for positioning, instead of the use of a rotary table, with the use of an optical encoder instead of the piezo-positioner, etc.

What is claimed is:

1. The method of the invention for measuring characteristics of materials comprising the steps of:

providing an oscillating circuit comprising a composite sensor as a combination of at least two sensor components selected from the group consisting of a capacitor and an inductive coil, said at least two sensor components being electrically connected to each other;

energizing said oscillating circuit and said composite sensor to cause an inductive-capacitive electromagnetic coupling between said at least two sensor components;

generating an inherent resonance in said oscillating circuit and measuring characteristics of said inherent resonance;

approaching said composite sensor to said material until a combined sensor-material oscillating circuit occurs due to an inductive-capacitive electromagnetic coupling between said composite sensor and said material, said inductive-capacitive electromagnetic coupling between said composite sensor and said material being generated at a frequency of said inherent resonance that provides a capacitive coupling having a magnitude comparable with an inductive coupling between said sensor and said material;

continuing the step of approaching until a system resonance occurs in said aforementioned sensor-material oscillating circuit;

measuring characteristics of said system resonance of the combined sensor-material oscillating circuit;

comparing said characteristics of said inherent resonance with the characteristics of said system resonance and determining a characteristic difference; and determining the characteristics of said material by matching the characteristic difference with known reference data for the same material;

said material being selected from a conductive material and a non-conductive material, wherein said non-conductive material comprises a non-conductive film on a conductive substrate.

2. The method of claim 1, wherein said at least two sensor components are two inductive coils.

3. The method of claim 2, wherein said system resonance is a complete resonance of said sensor-material oscillating circuit.

4. The method of claim 1, wherein said characteristics of said material are selected from the dielectric constant and thickness of said non-conductive film.

5. The method of claim 1, wherein said system resonance is a complete resonance of said sensor-material oscillating circuit.

6. A system for measuring characteristics of a material comprising:
   a resonance oscillating circuit having a composite sensor comprising: a combination of at least two components selected from the group consisting of a capacitor and an inductive coil, said at least two components being electrically connected and have electromagnetic interaction with each other when said oscillating circuit is energized, said composite sensor being arranged in said oscillating circuit in a position that allows positioning of said composite sensor at a distance sufficient for generating an inductive-capacitive coupling between said material and said electromagnetic interaction when said oscillating circuit is energized; and
   means for moving said composite sensor with respect to said material for establishing said distance between said composite sensor and said material;
   said resonance oscillating circuit having an inherent resonance, said inductive-capacitive electromagnetic coupling between said composite sensor and said material being generated at a frequency of said inherent resonance that provides a capacitive coupling having a magnitude comparable with an inductive coupling between said sensor and said material.

7. The system of claim 6, wherein said capacitor has a first capacitor electrode and a second capacitor electrode, which are spaced from each other to a distance required for developing a given capacitance, said second capacitor electrode being formed by said inductive coil.

8. The system of claim 6, wherein said inductive coil comprises a flat spiral coil having an outermost spiral turn, said first capacitor electrode comprises a plate arranged tangentially to said outermost spiral turn, said plate being substantially coplanar to said flat spiral coil, said flat spiral coil has a first end connected to a source of electric current and a second end which is free of connection, said plate being connected to a source of electric current.

9. The system of, claim 6, wherein said inductive coil comprises a helical coil, and said first capacitor electrode comprises a rod of a conductive material inserted into said helical coil, said helical coil has a first end connected to a source of electric current and a second end which is free of electrical connection, said rod being connected to a source of electric current.

10. The system of claim 6, wherein said at least two components of composite sensor are formed by methods of planar technique in the form of a conductive pattern on an etched silicon substrate.

11. The system of claim 6, further comprising a combined means that combines a function of generating said sensor-material system resonance and a function of stabilizing said distance during measuring said characteristics.

12. The system of claim 11, wherein said at least two components comprise an inductive coil and a capacitor.

13. The system of claim 11, wherein said at least two components comprise two inductive coils, which are spaced from each other at a distance that allows to develop a capacitance between said two inductive coils when said two inductive coils are energized.

* * * * *